United States Patent [19]

Willis

[11] 4,280,225

[45] Jul. 21, 1981

[54] COMMUNICATION SYSTEMS FOR TRANSPORTATION UNDERTAKINGS

[75] Inventor: Arthur J. Willis, Wirral, England

[73] Assignee: BICC Limited, London, England

[21] Appl. No.: 92,641

[22] Filed: Nov. 8, 1979

Related U.S. Application Data

[63] Continuation-in-part of Ser. No. 931,990, Aug. 8, 1978, abandoned.

[30] Foreign Application Priority Data

| | | | |
|---|---|---|---|
| Aug. 24, 1977 | [GB] | United Kingdom | 35473/77 |
| Dec. 2, 1977 | [GB] | United Kingdom | 50309/77 |

[51] Int. Cl.$^3$ .......................... H04B 3/60; H01B 7/18; H01B 11/18; H01Q 13/20

[52] U.S. Cl. ................................ 455/55; 174/102 SP; 174/120 SR; 174/121 A; 333/237

[58] Field of Search .................. 455/55; 333/237, 236, 333/243; 174/102 SP, 120 SR, 121 A

[56] References Cited

U.S. PATENT DOCUMENTS

| | | | |
|---|---|---|---|
| 3,629,707 | 12/1971 | Baba et al. | 455/55 |
| 3,781,725 | 12/1973 | Yoshida et al. | 333/237 |
| 3,810,186 | 5/1974 | Nakahara et al. | 333/237 |
| 3,823,255 | 7/1974 | La Gase et al. | 174/121 A |
| 3,949,329 | 4/1976 | Martin | 333/237 |
| 3,971,882 | 7/1976 | Alia | 174/120 SR |
| 4,034,153 | 7/1977 | Andres et al. | 174/120 SR |

*Primary Examiner*—Marc E. Bookbinder
*Attorney, Agent, or Firm*—Buell, Blenko, Ziesenheim & Beck

[57] ABSTRACT

A radiating cable communication system for a transportation undertaking is given useful fire-survival characteristics by incorporating on the surface of the cable dielectric, inside the outer conductor and so in the electric field, of the mica paper tape. This is much more effective than, for instance, using flame-retardant grades of polyethylene for the dielectric and flame-retardant grades of PVC for the sheath and, surprisingly, it has less effect on the electrical transmission characteristics of the cable.

5 Claims, 2 Drawing Figures

COMMUNICATION SYSTEMS FOR TRANSPORTATION UNDERTAKINGS

RELATED APPLICATIONS

This is a continuation-in-part of my application Ser. No. 931,990 filed Aug. 8, 1978, which is now abandoned.

BACKGROUND OF THE INVENTION

This invention relates to communication systems for transportation undertakings, such as mass transit and other railroad undertakings, operating vehicles along one or more than one predetermined route.

It is desirable to provide communication facilities in one or both directions between the vehicles of such a system and a fixed control centre, for the supply of operational data to the control centre and/or the provision of information or instructions to the crew of the vehicle and/or for remote or automatic control of the vehicle.

Conventional radio links are generally inadequate for these purposes, because many high-powered fixed transmitter/receiver stations would be required to ensure complete coverage of the route, and when the route is wholly or extensively in tunnel they may be practically impossible to operate.

Recent years have seen the adoption by the more advanced mass-transit undertakings of radiating cable systems in which a special type of high-frequency cable (a radiating cable) is used to transmit signals, at a frequency generally in the range 30–460 MHz, along the route and at the same time to couple them with an external radiation field that is confined to the immediate vicinity of the radiating cable and accessible to a relatively moveable antenna.

Usually the radiating cable is stationary and the antenna mounted on the vehicle, but proposals have been made to support a radiating cable along the length of a train for communication with a stationary transmitter and/or receiver.

Radiating cables are usually of coaxial construction with a "leaky" outer conductor either in the form of a wire braid or with at least one continuous slot and/or at least one row of mutually spaced apertures extending lengthwise along the cable.

The design of the radiating cable in such a system is a delicate balancing operation between transmission and radiation characteristics, since quite minor changes in attenuation or other characteristics can result in signals on the one hand being transmitted substantially entirely within the cable without adequate coupling to the external radiation field or on the other hand in radiation from the cable becoming so efficient that substantially all the signal is radiated within a short distance and none reaches the more distant parts of the route.

Radiating cable communication systems are of considerably value in the normal operation of the transportation system, and can have special benefits in case of mechanical breakdown or other mishap, provided that the radiating cable system itself continues to function.

On the other hand, especially in the kind of fail-safe automatic control system in which absence of a pilot signal is effective to stop trains, failure of the radiating cable communication system can cause passengers to be trapped temporarily in conditions of discomfort and possible danger, for example where the failure has been caused by a minor fire which has also resulted in smoke in the vicinity. There are also instances when communication between a control center and a train may be lost if a cable fails in a fire beyond the position of the train. It would therefore be desirable to use radiating cables capable of functioning at least for a short period (say at least ten minutes) under fire conditions. It is also desirable that the radiating cable itself should not contribute, or should contribute as little as possible, to the hazards arising under fire conditions, whether by spreading combustion or by producing smoke or fumes. Prior to my invention, cables satisfying these requirements were not available.

SUMMARY OF THE INVENTION

In accordance with my invention, a radiating cable communication system for a transportation utility having vehicles movable along at least one predetermined route comprising:

(a) a radiating cable extending longitudinally of said route and having an inner conductor; a dielectric comprising an alkene polymer; a leaky outer conductor; and a sheath of flame-retardant low-smoke insulating material (b) an antenna moveable along said route relative to said cable consequent upon movement of said vehicle along said route (c) a first transducer fixed with respect to said radiating cable and coupled to it (d) a second transducer fixed with respect to said antenna and coupled to it, at least one of said first transducer and said second transducer being a transmitter supplying a signal with a frequency in the range 30 to 460 MHz and at least the other of said first transducer responsive to said signal is distinguished by the presence on the outer surface of said dielectric of a layer of mica paper tape.

Surprisingly my research has shown that the presence of such a mica paper tape, notwithstanding that it is within the electric field of the cable and has a dielectric constant of about 6, compared with below 1.5 for the alkene polymer which constitutes the remainder of the dielectric, has no significant effect on the transmission characteristics of the cable. Such tolerance of exceedingly "foreign" material is doubly surprising when it is realised that much less extreme and less effective expedients, such as the mere adoption of conventional flame-retardant grades of polyethylene, result in comparable or worse changes, and in some cases make the cable unsatisfactory for its intended purpose.

Mica paper tapes have been used in other types of cable to improve fire survival characteristics, but hitherto on the basis of maintaining a minimum of insulation to prevent complete short-circuiting after organic insulating material was destroyed. I use mica paper not just for that purpose (because in a radiating cable installation mere prevention of short-circuits is not enough to keep the system operational) but to prevent or at least delay damage to the underlying dielectric, and thereby to preserve adequate transmission characteristics.

In the radiating cable required for my invention, the alkene polymer is preferably polyethylene, but polypropylene and other homopolymers and copolymers (of low power factor) and suitable blends based thereon can be used. It may all, if desired, be cross-linked to give a small additional degree of fire resistance by irradiation, by the direct action of free-radicals, or by the known two-stage silane-grafting methods, for example as described in the specification of British Pat. No. 1,286,460 (Dow Corning Ltd.) or of Swarbrick et al U.S. Pat. No. 4,117,195 (assigned to BICC Ltd. and Etablissements Maillefer S.A.). I prefer to use resin-bonded mica paper tape that is reinforced with glass fabric or glass yarns. The precise structure of the mica paper constituent of the tape is not critical, but the particles should be sufficiently densely packed to make the mica paper self-supporting; on the other hand large flakes or splittings of mica do not form an adequate substitute for mica paper. Mica paper prepared from phlogopite is preferred, but muscovite mica paper can be used. The reinforcing mineral fibres are preferably glass fibres, but other mineral fibres of high tensile strength, (such as asbestos fibres) could be used. They may run only in the longitudinal direction of the tape, or they may run in more than one direction with or without being woven together; at present woven glass fabric with its warp running along the length of the tape is preferred. Any type of bonding resin that adheres satisfactorily to the mica paper and the fibres and has adequate flexibility can be used (for example suitable silicone, polyester, epoxy, or phenolic resins). Since the resin is itself a combustible material, the minimum amount of resin compatible with satisfactory bonding should be used. The reinforced mica paper tape is preferably applied helically to the cable dielectric, but longitudinal taping could be used provided that the edges of the tape are overlapped and securely fixed down.

The dielectric may be solid, cellular or semi-air-spaced, e.g. using discs or other discrete spacers, helices, or longitudinal webs of the alkene polymer.

The leaky outer conductor may be a braid or a slotted or apertured tube (or tape), as already indicated; a wire braid outer conductor is especially useful where flexibility is essential, for instance in tortuous installations; an outer conductor having a slot and/or a row of apertures is especially useful where low attenuation is important, for instance in installations where the cable is to carry signals for long distances or when the frequency of the signals is very high.

It is desirable for the sheath, in addition to its flame-retardant properties, to be of a material that evolves little or ideally no particulate material or toxic or choking or corrosive fumes if they are burned (and virtually all organic materials will burn under some conditions, e.g. if preheated and/or continuously supplied with heat by an external fire), and for this reason conventional flame-retardant PVC compounds are unsuitable. Special acid-binding PVC formulations are now available and could be used, but (because it is difficult to be confident that there are no fire conditions in which these materials can produce acid fumes) it is preferable to use substantially halogen-free flame-retardant materials. Recommended materials include a composition comprising an alkene homo-polymer or copolymer (that is a copolymer of two or more different alkenes) or an ethylene/vinyl acetate copolymer, at least 55% of inert mineral filler, a low smoke plasticiser if required, an anti-oxidant and optionally a curing agent for the polymer; and the sheath may be enclosed in a fire barrier layer of a heat-resistant low flammability insulating material to improve its fire performance. Suitable barriers include:

(a) a close wrapping of a resin bonded mineral fibre reinforced mica paper tape, similar to that on the surface of the dielectric;

(b) heat-resistant plastics tape such as polyimides (e.g. those sold under the trademark KAPTON); and (c) glass fabric tapes coated with silicone rubber or other suitable resin.

The sheathing compositions referred to above will commonly include up to 80% of the filler and may include even more. Preferred fillers are hydrated alumina and china clay of suitable particle size.

In the case of the composition including an alkene homo-polymer or copolymer, preferred polymers are the ethylene-propylene copolymer rubbers (EPR) and ethylene-propylene-diene terpolymers (EPDM). Flame-retardant polyethylene compounds, preferably crosslinked, can also be used. A plasticiser will be required with most of these polymers; preferred plasticisers are polyisobutylene and paraffinic waxes or paraffinic oils, which may advantageously be used together. A preferred range of compositions comprises:

EXAMPLE A

| | | |
|---|---|---|
| Polymer: | Alkene polymer | 15-35% |
| Filler: | Alumina trihydrate and/or china clay | 15-80% |
| Plasticiser and/or processing aid: | Polyisobutylene and/or paraffin wax | 7-20% |
| Curing agents if required and anti-oxidants | | up to 5% |

In the case of the composition including an ethylene/vinyl acetate copolymer, the proportion of vinyl acetate monomer in the copolymer may vary widely, and the presence of minor amounts of other comonomers is not excluded. Copolymers comprising 25-55 mole % acetate are preferred.

Conventional processing aids for ethylene/vinyl acetate copolymers, such as stearic acid and certain stearates, can be used and may be essential for some copolymers. Curing agents can be included if desired. A preferred range of compositions comprises:

EXAMPLE B

| | | |
|---|---|---|
| Polymer: | Ethylene/vinyl acetate copolymer | 15-35% |
| Filler: | Alumina tri-hydrate and/or china clay | 55-80% |
| Processing aid: | Stearic acid | 0-5% |
| Curing agents, if required, and anti-oxidant: | | up to 5% |

The fire barrier layer described offers some resistance to emission of volatile materials or smoke from the interior of the cable.

The mode of operation of the mica paper type of fire barrier has not yet been completely established but it would appear that the mica paper acts as a stable barrier, on the one hand reducing the contact of external flame and hot gas with the enclosed combustible material or materials, and so slowing down combustion, and on the other hand inhibiting the escape of smoke particles from within it and yet being sufficiently permeable to gas not to build up disruptive gas pressures within the barrier.

In cases where the close wrapping of mica paper tape needs mechanical protection an overlying thin extruded or braided oversheath layer of a low smoke polymeric material can be used, or an incombustible braid (of glass fibres for example) might be preferred for some applications. Suitable materials for use as braid include polypropylene and high density polyethylene.

The transducer and antenna and the mode of installation and operation of the system may be entirely conventional, and will not be described in detail.

DETAILED DESCRIPTION OF THE DRAWINGS

Figure 1:
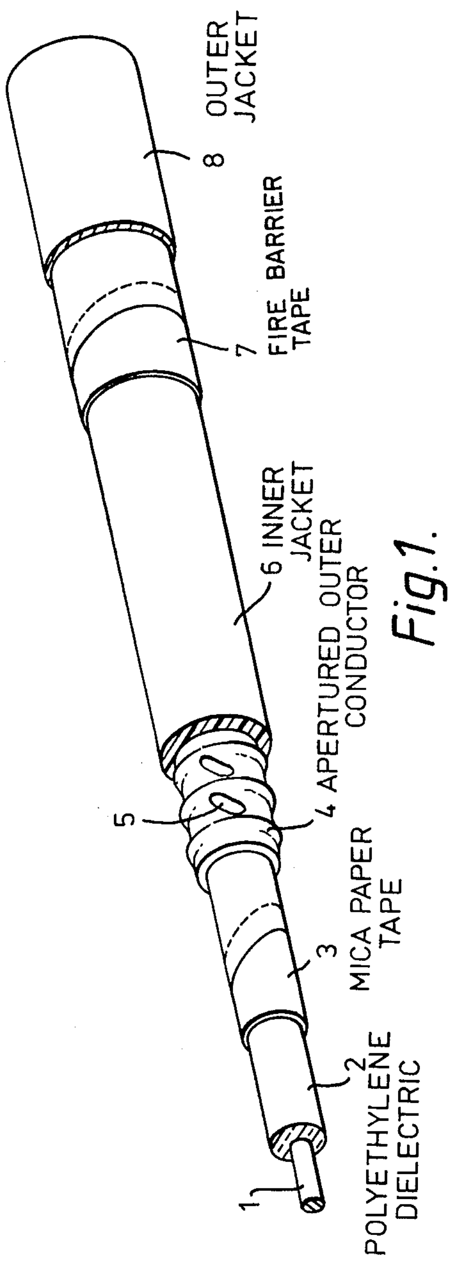
FIG. 1 is a diagrammatic cut-away view of one form of cable suitable for use in the communication system of my invention.

The cable shown comprises a central conductor 1, dielectric comprising an alkene polymer component 2 and a silicone-resin bonded glass fibre, reinforced mica paper tape layer 3, a corrugated longitudinally applied tape outer conductor 4 having apertures 5 of conventional form to make it leaky, a sheath 6 of flame-retardant insulating material, a fire barrier tape 7 and a thin outer sheath 8 of low-smoke polymeric material.

Figure 2:
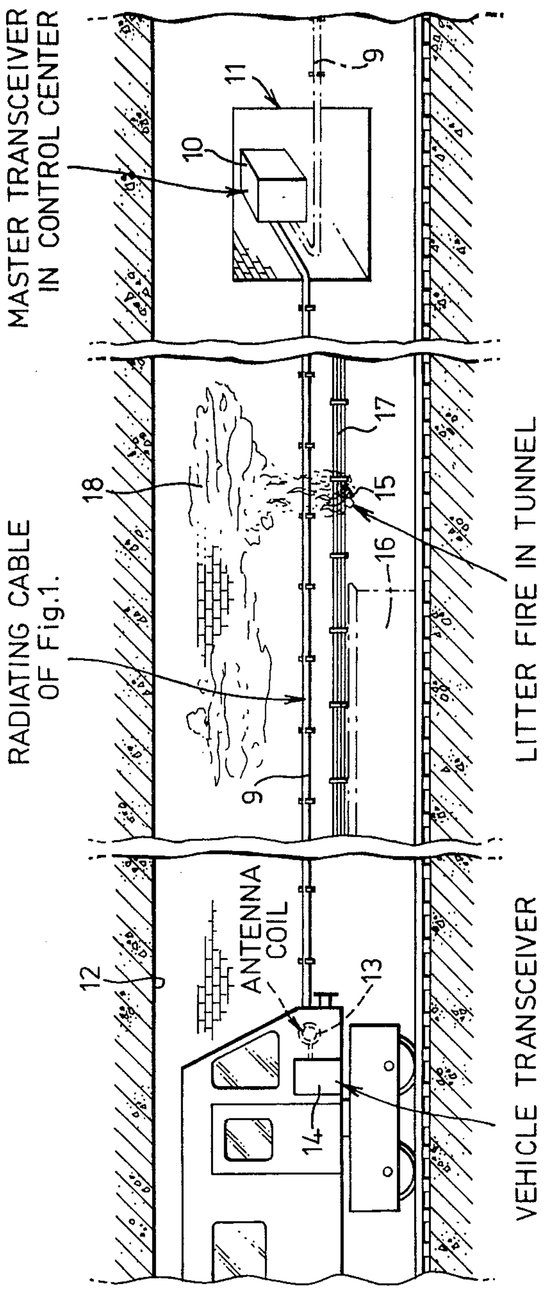
FIG. 2 is a sketch of part of an underground mass-transit system incorporating a communication system of my invention.

In the system of FIG. 2, the radiating cable 9 is connected to a fixed master transceiver 10 in a control center 11 and extends along the side of the tunnel 12. An antenna coil 13 onboard each vehicle (train) couples with the external radiation field of the radiating cable and thereby transfers signals between the radiating cable and a mobile transceiver 14.

The signals may fulfill any desired function, such as providing telephone contact between the train crew and the control center, supplying signal aspect information to an on-board display, entering over-ride commands limiting the driver's actions, or complete remote control of the functioning of the train.

The sketch illustrates a hazard situation in which a quantity of paper litter 15 has been blown from an underground station platform 16 by the air current generated by a preceding train, has caught in the supports for a group of cables 17 and has been ignited by the fanning effect of the air currents on a smouldering cigarette end carried with it. Particularly if old or less satisfactory cables are involved, a small fire of this kind may quickly generate quite large quantities of smoke 18, possibly including significant amounts of hydrogen chloride and/or other harmful or unpleasant vapours. It is obviously desirable in this situation for the approaching train to pass quickly by the fire if it is safe to do so, or else to be stopped as far away from the fire as possible. In either case, communication with the train is vital, but is threatened, if a conventional radiating cable is used, because it may fail at the site of the fire within a few minutes.

The best installations made according to my invention will continue to function acceptably after an hour's exposure to this kind of small, relatively-cool, fire, which in practice usually means that it will still be functioning when the fire has burned itself out, and replacement can possibly be left until the entire transportation system closes down for the night, minimising delays and frustration to passengers.

FURTHER DETAILS OF CABLES FOR USE IN THE INVENTION

The following example describes in detail my preferred form of cable for use in my invention:

The cable has an inner conductor of solid round copper wire, 2.3 mm in diameter and a semi-airspace dielectric of thread-and-tube construction, the thread and tube each being round and made of polyethylene, the thread having a diameter of 2.59 mm and the tube an outer diameter of 9.0 mm and a wall thickness of 0.75 mm. Over the tube is applied a single layer, 0.12 mm thick, of a reinforced mica tape including a mica paper layer, 0.05 mm thick (applied on the inside) and an open weave glass cloth backing 0.07 mm thick and having on average about 13 glass yarns per centimeter longitudinally and 7 glass yarns per centimeter transversely, bonded together with a silicone resin constituting about 20% by weight of the material. (This tape was supplied in England by Jones Stroud Insulations Limited).

Directly over this glass/mica tape is longitudinally applied a corrugated copper tape 35 mm wide and 0.18 mm thick, punched with two rows of round holes, each row centred 7.5 mm from the mid-line of the tape on respective sides and the holes being 9.1 mm in diameter, the spacing in each row 23.3 mm and the two rows staggered so that each hole is longitudinally positioned midway between two holes of the other row. The outer diameter of the applied copper tape is 10.5 mm, and a sheath of a low-smoke ethylene-propylene-diene terpolymer rubber compound completes a cable 14.6 mm in diameter.

The sheathing compound comprises: in parts by weight:

| | | | |
|---|---|---|---|
| Terpolymer | | | 22 |
| Hydrated alumina (nominal particle size 1 micrometer) | | | 62 |
| Plasticisers: | Polyisobutylene | 8.7 | 12 |
| | Paraffin wax | 3.3 | |
| Antioxidants | | | up to 4 |

In a comparison of cable performances, two series of experimental cables were prepared. Each series was based on modification of one of the standard production radiating cables sold by my employer BICC Ltd., and was compared with that standard cable.

The first series was based on BICC cable reference T3515 having an inner conductor of plain copper wire 2.311 mm in diameter, semi-airspace polyethylene dielectric of thread-and-tube construction with an overall diameter of 9.53 mm, a leaky screen of plain copper wires braided 24 ends 5 spindles with a lay of 50 mm (diameter over braid 10.4 mm), a sheath of polyethylene bringing the diameter to 13.1 mm and an oversheath of a standard PVC compound to overall diameter 16.7 mm. Experimental cables A and B (for comparison) were identical except that (i) the plain polyethylene of the standard cable was replaced by a commercial flame-retardant grade of polyethylene, namely those sold under the reference numbers 0487 and 0532 respectively by Imperial Chemical Industries Ltd., and (ii) the sheath and oversheath were replaced by a single layer of a flame-retardant PVC compound in accordance with BICC Ltd.'s British Pat. No. 1,418,027. Experimental cable C, following the teaching of my invention, was identical with the standard cable except (i) a lapping of the mica paper tape described above was applied directly to the surface of the dielectric, raising the diameter to 10.01 mm and the outside diameter of the outer conductor to 10.98 mm; and (ii) the sheath and over-sheath were replaced by a single layer of a flame-retardant low-smoke composition based on an ethylene-propylene-diene terpolymer (EPDM) to an outside diameter of 15.05 mm. This EPDM composition comprises 22% EPDM, 62% hydrated alumina, 7.7% polyisobutylene, 3.3% paraffin slack wax, 1% stearic acid and 4% conventional curing acids and antioxidants, and is more fully described in the specification of copending U.S. patent application Ser. No. 3048 filed Jan. 12, 1979, by Thomas Sullivan and James Edward Braddock.

The second series of experimental cables was based on BICC Ltd. standard radiating cable T3522, which is substantially the same as T3515 described above except that the outer conductor is in the form of an apertured corrugated plain-copper tape and there is no over-sheath. Experimental cables D, E and F incorporated the same modifications as A, B and C respectively.

Fire tests were carried out using a trough of denatured alcohol as a reproducible fire source comparable in flame temperature to a paper fire. The trough was 225 mm long and located 140 mm below the test sample, and the volume of alcohol was chosen to burn for 12–15 minutes. Cables were tested (i) in bundles of four, strapped together and supported horizontally, and (ii) singly in the vulnerable position of a horizontal-to-vertical bend of minimum radius (80 mm for the braided cables of the first series and 125 mm for the apertured tape cables of the second series). Most of the fire tests were duplicated. Qualitative measurements of smoke obscuration were made in the fire tests, and electrical tests were carried out on the cables. Results are given in the following Tables, short-circuits being monitored at 500 V direct current and "none" indicating that there was no short-circuit at any time during the test, and "total" that the fire damage extended to at least one end of the sample (in the bend test, always the upper end).

TABLE 2

ELECTRICAL TESTS

| Cable | Capacitance (pF/m) | Attenuation (dB/100m) at frequency (MHz) 30 | 85 | 150 | 300 | 470 |
|---|---|---|---|---|---|---|
| T 3515 | 51 | 2.1 | 3.3 | 4.6 | 6.5 | 8.3 |
| A | 57 | 2.2 | 3.5 | 4.8 | 6.5 | 8.4 |
| B | 56 | 2.4* | 4.1* | 5.5* | 8.1* | 11.5* |
| C | 52 | 1.9 | 3.3 | 4.4 | 6.0 | 8.0 |
| T 3522 | 51 | 2.1 | 3.2 | 4.3 | 6.2 | 7.8 |
| D | 54 | 1.8* | 3.0 | 3.9* | 5.7* | 7.7 |
| E | 53 | 2.0 | 3.5* | 4.9* | 7.2* | 9.6* |
| F | 53 | 1.9 | 3.2 | 4.3 | 6.1 | 7.9 |

I claim:

1. A radiating cable communication system for a transportation utility having at least one vehicle movable along at least one predetermined route comprising (a) A radiating cable installed along the length of said route and having an inner conductor; a dielectric comprising an alkene polymer; a leaky outer conductor; and a sheath of flame retardant low-smoke insulating material.

(b) an antenna movable along said route relative to said cable consequent upon movement of said vehicle along said route (c) a first transducer fixed with respect to said radiating cable and coupled to it (d) a second transducer fixed with respect to said antenna and coupled to it; at least one of said first transducer and said second transducer being a transmitter supplying a signal with a frequency in the range 30–460 MHz and at least the other of said first transducer and said second transducer being a receiver responsive to said signal, distinguished by the presence on the outer surface of said dielectric of a layer of mica paper tape.

2. A communications system as claimed in claim 1 in which said tape is of mica paper reinforced with glass fabric.

3. A communication system as claimed in claim 1 in which said mica paper tape comprises glass fibre.

4. A communication system as claimed in claim 1 in which said outer conductor is a slotted or apertured tube or tape.

5. A communication system as claimed in claim 1 in which the sheath is enclosed by a fire barrier layer.

TABLE 1:

FIRE TESTS

| | Horizontal Test | | | | Bend Test | | | |
|---|---|---|---|---|---|---|---|---|
| Cable | Time to short circuit min - sec | Time to flame extinction min - sec | Length of cable damaged mm | Relative smoke obscuration % | Time to short circuit min - sec | Time to flame extinction min - sec | Length of cable damaged mm | Relative smoke obscuration % |
| T3515 | 6-50, 6-00 | 27-38, 26-05 | 533, 559 | 100, 100 | 5-00, 4-50 | 14-00, 14-50 | Total | 88, 80 |
| A | 9-25, 12-35 | 14-55, 13-40 | 280, 280 | 92, 93 | 1-15, 4-10 | 15-06, 15-06 | 370, Total | 40, 10 |
| B | 6-15, 7-45 | 15-28, 16-00 | 280, 317 | 99, 94 | 4-40, 4-30 | 14-00, 14-25 | Total | 75, 83 |
| C | NONE | 17-00, 18-10 | 216, 229 | 6, 50 | NONE | 15-01, 14-58 | 310, 300 | 5, 3 |
| T3522 | 3-25, | 13-00, | Total | 91 | not tested | | | |
| D | 11-13, None | 14-32, 14-15 | 280, 254 | 80, 72 | None, 9-21 | 14-00, 14-00 | 360, 390 | 40, 5 |
| E | 12-00, None | 13-10, 13-45 | 304, 305 | 80, 99 | 15-00, 10-00 | 14-53, 14-45 | Total | 45, 75 |
| F | NONE | 23-13, 19-45 | 241, 229 | 8, 52 | NONE | 13-40, 13-37 | 320, 360 | 6, 3 |

* * * * *